April 28, 1970     G. E. LANGBEHN     3,508,691

BELT TAPE REEL HOLDER

Filed Nov. 24, 1967

GLENN E. LANGBEHN
INVENTOR.

BY *[signature]*
HIS ATT'Y

United States Patent Office 3,508,691
Patented Apr. 28, 1970

3,508,691
BELT TAPE REEL HOLDER
Glenn E. Langbehn, 914 N. Euclid,
Pierre, S. Dak. 57501
Filed Nov. 24, 1967, Ser. No. 685,673
Int. Cl. A45c 1/04
U.S. Cl. 224—26                                   1 Claim

ABSTRACT OF THE DISCLOSURE

A belt supported hanger for coiled tape measures. The hanger utilizes an adjustable hook to clamp the tape measure into the hanger, the measure being useable while supported by the hanger.

---

This invention pertains to an hanger for a tape measure and more particularly to such a hanger in which the measure can be clamped and by which the tape measure may be supported from the belt of a workman.

Coiled tape measures such as those used by builders, surveyors, and the like, are often needed on a job site or in the field on short notice. Therefore, it is common for such tape measures to be carried by the workmen. However, a fifty foot (or longer) tape measure takes up considerable space in the pocket of a short or trousers, and it is therefore much more convenient to be able to support the device from a workman's belt.

There have been, in the past, varying ways of providing for belt support of such tape measures. The present invention provides for a very light weight device in which the coil of the tape measure can be clamped, and still allow the tape to be uncoiled without removing the case from the carrier.

A more complete understanding of the invention in its embodiment may be had from the following specification and figures in which.

Figure 2:
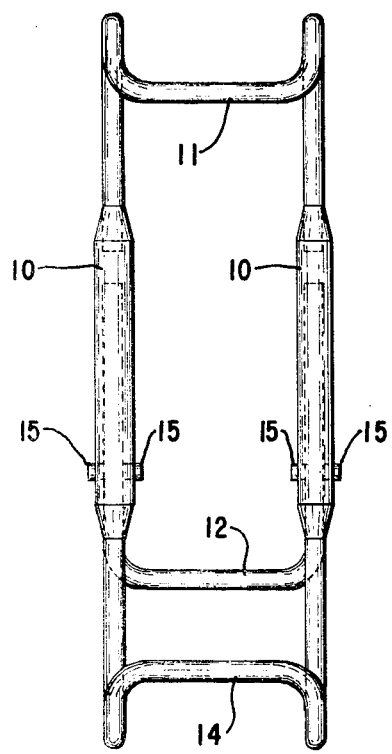
FIG. 2 is a front elevational view of the device.
Figure 1:
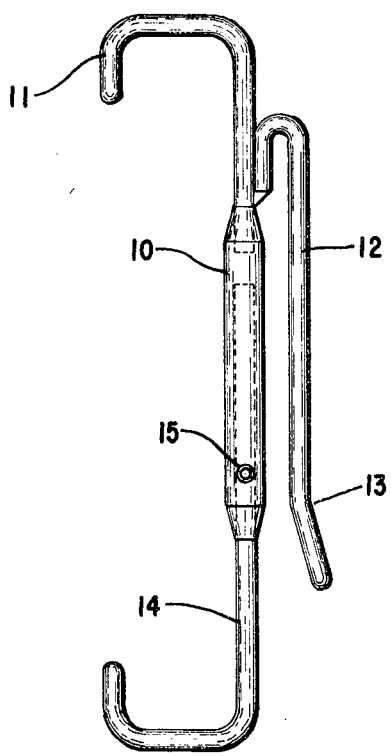
FIG. 1 is an end elevational view of the device of my invention.

Briefly, my invention comprises a wire framework in which a tape measure reel may be mounted for carrying from a belt. One portion of the framework is slidably disposed relative to the other, and can be clamped in a fixed position so that the reel of the tape measure may be held within the device.

More specifically, and in reference to the drawings, my device comprises a pair of parallel body members 10. At one end—illustrated as the upper end, but not necessarily so—a hook member 11 formed of a continuous piece of heavy wire or light rod, is welded to the body members. A belt hook 12 composed of similar material and spaced substantially parallel to said body members is also welded either to the body member itself, or to the stationary hook 11. This belt hook may have a bent end 13 which provides a wedge shaped opening which will make attachment to the belt more easy.

At the end of each body member 10, opposite the fixed hook 11, I provide for longitudinal openings in which the movable hook 14 is slidably disposed. This hook is similar in nearly all respects to the fixed hook 11 except that it has longer legs disposed within the openings in the body. Set screws 15 are threaded into the body 10 in position to be clamped against the leg of the movable hook to hold it in position.

The use of the device is now obvious. The case of the tape measure (not shown) is placed between the hooks 11 and 14. Hook 14 is then slideably adjusted to clamp the case or reel between the hooks and the set screws are tightened to hold the hook 14 in its adjusted position. Since the carrier is fully open, there is no restriction to the withdrawal of the tape measure from the case, and it can be readily used while within the holder. Furthermore, the spacing between the hooks provides for radial pressure on the case regardless of which direction the tape is pulled because they embrace an arc on the circumference of the case or reel rather than simply being tangential thereto.

It will therefore be apparent that I have provided a light-weight, convenient reel holder for supporting a tape measure from a workman's belt.

Having thus described my invention in one embodiment thereof, I am aware that numerous and extensive departures may be made therefrom without departing from the spirit and scope of the invention.

I claim:

1. A hanger for the reel of a tape measure comprising a pair of parallel body members, said body members being formed to provide tubular interior openings, integral hook means formed of wire material having legs fixed in part of said opening in each body member, said legs being formed with a hook and having a cross member joining said hook forms, belt hook means formed of similar material fixed to said hook means and extending in parallel, spaced relationship to said body members whereby said belt hook means is adapted to embrace a belt between itself and said body members, and movable hook means formed similarly to said integral hook means, said movable hook means having longer leg portions slidably disposed in said openings opposite to said integral hook means whereby the distance between the hooks on said integral and said movable hook means can be varied, and holding means on said body members adapted to engage said movable hook means to hold said movable hook means in an adjusted position relative to said body members.

References Cited

UNITED STATES PATENTS

| 755,432 | 3/1904 | Bainbridge | 248—360 X |
| 815,893 | 3/1906 | Adams | 248—305 X |
| 1,357,280 | 11/1920 | Dulle | 248—490 |
| 2,614,778 | 10/1952 | Graves | 248—490 |
| 2,877,585 | 3/1959 | Horwitt | 248—490 X |
| 2,905,412 | 9/1959 | Kipp | 248—490 |

CHANCELLOR E. HARRIS, Primary Examiner

U.S. Cl. X.R.

224—25; 248—311, 360